US009687888B2

(12) United States Patent
Hasegawa et al.

(10) Patent No.: US 9,687,888 B2
(45) Date of Patent: Jun. 27, 2017

(54) ULTRASONIC CLEANING APPARATUS AND ULTRASONIC CLEANING METHOD

(71) Applicant: KAIJO CORPORATION, Tokyo (JP)

(72) Inventors: Hiroshi Hasegawa, Tokyo (JP); Yasuhiro Imazeki, Tokyo (JP); Shoji Yakuwa, Tokyo (JP)

(73) Assignee: KAIJO CORPORATION, Tokyo (JP)

( * ) Notice: Subject to any disclaimer, the term of this patent is extended or adjusted under 35 U.S.C. 154(b) by 44 days.

(21) Appl. No.: 14/652,616

(22) PCT Filed: Oct. 15, 2014

(86) PCT No.: PCT/JP2014/077411
§ 371 (c)(1),
(2) Date: Jun. 16, 2015

(87) PCT Pub. No.: WO2015/068543
PCT Pub. Date: May 14, 2015

(65) Prior Publication Data

US 2015/0336138 A1 Nov. 26, 2015

(30) Foreign Application Priority Data

Nov. 11, 2013 (JP) ................................ 2013-233077

(51) Int. Cl.
*B08B 3/12* (2006.01)
*A61C 17/20* (2006.01)
(Continued)

(52) U.S. Cl.
CPC ................ *B08B 3/102* (2013.01); *B06B 3/00* (2013.01); *B08B 3/12* (2013.01); *B08B 2203/0288* (2013.01)

(58) Field of Classification Search
CPC .. B08B 3/00; B08B 3/12; B08B 3/102; B08B 203/02882; A61C 17/20; B01J 19/10;
(Continued)

(56) References Cited

U.S. PATENT DOCUMENTS 2,980,123 A 4/1961 Lemelson
5,927,306 A 7/1999 Izumi et al.
(Continued)

FOREIGN PATENT DOCUMENTS

JP 63-39487 3/1988
JP 6-461 1/1994
(Continued)

OTHER PUBLICATIONS

International Search Report issued Jan. 27, 2015 in International Application No. PCT/JP2014/077411.

*Primary Examiner* — Saeed T Chaudhry
(74) *Attorney, Agent, or Firm* — Wenderoth, Lind & Ponack, L.L.P.

(57) ABSTRACT

An ultrasonic cleaning apparatus includes: an ultrasonic vibrator (11); a liquid storage part (12) provided in contact with the ultrasonic vibrator; an inflow port (12*a*) that makes a cleaning liquid (13) flow in the liquid storage part; and an outflow port (12*b*) that makes the cleaning liquid flow out of the liquid storage part. A contact surface (11*a*), of the ultrasonic vibrator, which comes into contact with the cleaning liquid, is disposed lower than each of the inflow port and the outflow port.

8 Claims, 4 Drawing Sheets

(51) Int. Cl.
*B06B 3/00* (2006.01)
*B08B 3/10* (2006.01)

(58) Field of Classification Search
CPC ......... H01L 21/67051; H01L 21/67057; H01L 21/67017; B06B 3/00
See application file for complete search history.

(56) References Cited

U.S. PATENT DOCUMENTS

2006/0283328 A1* 12/2006 Saiki .................. B01D 19/0005 96/289
2007/0056610 A1* 3/2007 Lee ......................... A47J 43/24 134/25.3

FOREIGN PATENT DOCUMENTS

| | | |
|---|---|---|
| JP | 10-151422 | 6/1998 |
| JP | 2002-299304 | 10/2002 |
| JP | 2007-289807 | 11/2007 |

* cited by examiner

ULTRASONIC CLEANING APPARATUS AND ULTRASONIC CLEANING METHOD

BACKGROUND OF THE INVENTION

1. Technical Field

The present invention relates to an ultrasonic cleaning apparatus and an ultrasonic cleaning method.

2. Description of the Related Art

FIG. 4 is a cross-sectional view schematically showing a conventional ultrasonic cleaning apparatus.

The ultrasonic cleaning apparatus has a liquid storage part 112, and an ultrasonic vibrator 111 that applies ultrasonic vibrations to a cleaning liquid 113 in the liquid storage part 112. A contact surface 111*a* on which the ultrasonic vibrator 111 comes into contact with the cleaning liquid 113 is directed downward. Namely, the contact surface 111*a* faces the direction in which the force of gravity is applied (the direction in which the cleaning liquid 113 falls).

Furthermore, the ultrasonic cleaning apparatus has a cleaning liquid supply mechanism 116 that supplies the cleaning liquid 113 to the liquid storage part 112. The cleaning liquid supply mechanism 116 has a supply pipe 115, a flow control mechanism 114 and a cleaning liquid supply source (not illustrated).

Next, a method for cleaning an object to be cleaned such as a substrate through the use of the ultrasonic cleaning apparatus will be explained.

First, a cleaning liquid 113 such as water or a chemical liquid is supplied to the supply pipe 115 by the cleaning liquid supply source, and the cleaning liquid whose flow rate has been controlled by the flow control mechanism 114 is supplied to the liquid storage part 112 through the supply pipe 115 and is temporarily stored in the liquid storage part 112. Ultrasonic vibrations are applied to the cleaning liquid 113 stored in the liquid storage part 112, through the use of the ultrasonic vibrator 111, and the cleaning liquid 113 to which the ultrasonic vibration has been applied is discharged to the outside of the liquid storage part 112 through a nozzle 121. The cleaning liquid 113 discharged maintains a state where ultrasonic vibrations have been applied, and is supplied to an object to be cleaned (not illustrated), which is subjected to ultrasonic cleaning (see, for example, Japanese Patent Laid-open Publication No. 2007-289807).

Incidentally, there is a request for reducing the amount of the cleaning liquid that is used in cleaning an object to be cleaned. If the amount of the cleaning liquid can be reduced, cleaning costs can be reduced. In addition, there is a case of performing cleaning through the use of a very expensive cleaning liquid, and in the case of the cleaning liquid, the effect of reducing cleaning costs is large.

However, in the above-described conventional ultrasonic cleaning apparatus, there is a limit to reduction in the use amount of the cleaning liquid, and the amount of the cleaning liquid used cannot sufficiently be reduced. The reason thereof will be explained below.

In the above-described ultrasonic cleaning apparatus, if the amount of the cleaning liquid 113 to be supplied to the liquid storage part 112 by the cleaning liquid supply mechanism 116 is excessively reduced, a state in which the cleaning liquid 113 is not filled in the liquid storage part 112 is brought about, and a part that does not come into contact with the cleaning liquid 113 (a cavity) is generated in the contact surface 111*a* of the ultrasonic vibrator 111 to thereby be put into a water-free operation state. The water-free operation leads to excessive amplitude of the ultrasonic vibrator 111 and causes a failure of the ultrasonic vibrator 111. Therefore, the amount of the cleaning liquid 113 used cannot be reduced exceeding a level that will induce the water-free operation state.

As a method for further reducing the use amount of the cleaning liquid 113, it is considered that the amount of the cleaning liquid 113 to be discharged from the nozzle 121 is reduced by making the diameter of the nozzle 121 smaller. However, if the diameter of the nozzle 121 is made too small, ultrasonic waves are attenuated when the cleaning liquid to which ultrasonic vibrations have been applied passes through the nozzle 121, and thus the ultrasonic waves cannot pass through the nozzle 121 and the lowering of the cleaning effect is caused. Therefore, it is necessary to set the diameter of the nozzle 121 to be larger than the wavelength of the ultrasonic waves in order not to attenuate ultrasonic waves.

Specifically, when ultrasonic vibrations of 430 kHz in frequency are applied to the cleaning liquid 113, the wavelength of the ultrasonic wave is represented by sonic speed/frequency=1500/430000, which is about 3.5 mm. Furthermore, when an ultrasonic vibration of 950 kHz in frequency is applied to the cleaning liquid 113, the wavelength of the ultrasonic wave is represented by sonic speed/frequency=1500/950000, which is about 1.6 mm. Accordingly, desirably, the diameter of the nozzle 121 is set to be 3.5 mm or more when the frequency of ultrasonic waves is 430 kHz, or the diameter of the nozzle 121 is set to be 1.6 mm or more when the frequency of ultrasonic waves is 950 kHz. As described above, the diameter of the nozzle 121 cannot be reduced only to the extent of not attenuating ultrasonic waves, and the use amount of the cleaning liquid cannot sufficiently be reduced.

SUMMARY OF THE INVENTION

An object of an aspect of the present invention is to reduce the amount of a cleaning liquid used in cleaning an object to be cleaned.

Hereinafter, various aspects of the present invention will be explained.

[1] An ultrasonic cleaning apparatus, comprising: an ultrasonic vibrator; a liquid storage part provided in contact with the ultrasonic vibrator; an inflow port that makes a cleaning liquid flow in the liquid storage part; and an outflow port that makes the cleaning liquid flow out the liquid storage part, wherein a contact surface on which the ultrasonic vibrator comes into contact with the cleaning liquid is disposed lower than each of the inflow port and the outflow port.

[2] The ultrasonic cleaning apparatus according to [1], comprising: a cleaning liquid supply mechanism that supplies the cleaning liquid to the liquid storage part through the inflow port; and an ultrasonic propagating tube that flows, through the outflow port, the cleaning liquid to which ultrasonic vibrations have been applied with the ultrasonic vibrator in the liquid storage part, wherein an object to be cleaned is cleaned with the cleaning liquid discharged from the ultrasonic propagating tube.

[3] The ultrasonic cleaning apparatus according to [2], wherein: said liquid storage part is disposed above said contact surface; and said ultrasonic propagating tube has a shape of being bent downward.

[4] The ultrasonic cleaning apparatus according to [2], wherein: said liquid storage part is disposed below said contact surface; said liquid storage part includes a part of said ultrasonic propagating tube; and said ultrasonic propagating tube has a shape of being bent downward.

[5] The ultrasonic cleaning apparatus according to any one of [2] to [4], wherein said cleaning liquid supply mechanism has a flow control mechanism that controls a flow rate of said cleaning liquid to be supplied to said liquid storage part.

[6] The ultrasonic cleaning apparatus according to [5], wherein said ultrasonic vibrator has a function of starting ultrasonic wave oscillation after said flow control mechanism makes a cleaning liquid flow in said liquid storage part from said inflow port to thereby put said contact surface into a state of being covered with said cleaning liquid and stops an inflow of said cleaning liquid from said inflow port, and simultaneously with restarting an inflow of said cleaning liquid into said liquid storage part from said inflow port or before restarting an inflow of said cleaning liquid.

[7] The ultrasonic cleaning apparatus according to [6], wherein said ultrasonic vibrator has a function of stopping ultrasonic wave oscillation, after said flow control mechanism makes a cleaning liquid in said liquid storage part to which ultrasonic vibrations had been applied by the start of ultrasonic wave oscillation with the ultrasonic vibrator, flow out said liquid storage part from said outflow port, simultaneously with stopping an inflow of a cleaning liquid into said liquid storage part from said inflow port or after stopping an inflow of said cleaning liquid.

[8] The ultrasonic cleaning apparatus according to any one of [1] to [7], wherein said liquid storage part has a function of maintaining a state where said contact surface is covered with a cleaning liquid, even when an inflow of said cleaning liquid from said inflow port is stopped or inflow rate of said cleaning liquid is made small, after putting said contact surface into a state of being covered with said cleaning liquid by making said cleaning liquid flow in said liquid storage part from said inflow port.

[9] An ultrasonic cleaning method comprising the steps of: preparing an ultrasonic cleaning apparatus which has a liquid storage part provided in contact with an ultrasonic vibrator, and in which a contact surface on which the ultrasonic vibrator comes into contact with a cleaning liquid in the liquid storage part is disposed lower than each of an inflow port and an outflow port of the liquid storage part; and maintaining a state where the contact surface is covered with the cleaning liquid, even when an inflow of the cleaning liquid from the inflow port is stopped or inflow rate of the cleaning liquid is made small, after putting the contact surface into a state of being covered with the cleaning liquid by making the cleaning liquid flow in the liquid storage part from the inflow port.

[10] An ultrasonic cleaning method comprising the steps of: preparing an ultrasonic cleaning apparatus which has a liquid storage part provided in contact with an ultrasonic vibrator, and in which a contact surface on which the ultrasonic vibrator comes into contact with a cleaning liquid in the liquid storage part is disposed lower than each of an inflow port and an outflow port of the liquid storage part; stopping an inflow of the cleaning liquid from the inflow port, after putting the contact surface into a state of being covered with the cleaning liquid by making the cleaning liquid flow in the liquid storage part from the inflow port; and applying ultrasonic vibrations to the cleaning liquid in the liquid storage part, by starting ultrasonic wave oscillation with the ultrasonic vibrator simultaneously with restarting an inflow of a cleaning liquid into the liquid storage part from the inflow port or before restarting an inflow of the cleaning liquid.

[11] The ultrasonic cleaning method according to claim 10, comprising the steps of: making said cleaning liquid to which said ultrasonic vibrations have been applied flow out said liquid storage part from said outflow port, after starting ultrasonic wave oscillation with said ultrasonic vibrator; and stopping ultrasonic wave oscillation with said ultrasonic vibrator, simultaneously with stopping an inflow of a cleaning liquid into said liquid storage part from said inflow port or after stopping an inflow of said cleaning liquid.

According to an aspect of the present invention, the amount of a cleaning liquid used in cleaning an object to be cleaned can be reduced.

DETAILED DESCRIPTION OF THE INVENTION

Hereinafter, the embodiments of the present invention will be explained in detail with reference to the drawings. However, a person skilled in the art would be able to easily understand that the present invention is not limited to the following explanation, but that the forms and details thereof can be variously modified without deviating from the purport and the scope of the present invention. Accordingly, the present invention should not be construed as being limited to the description contents of the embodiments.

First Embodiment

Figure 1:
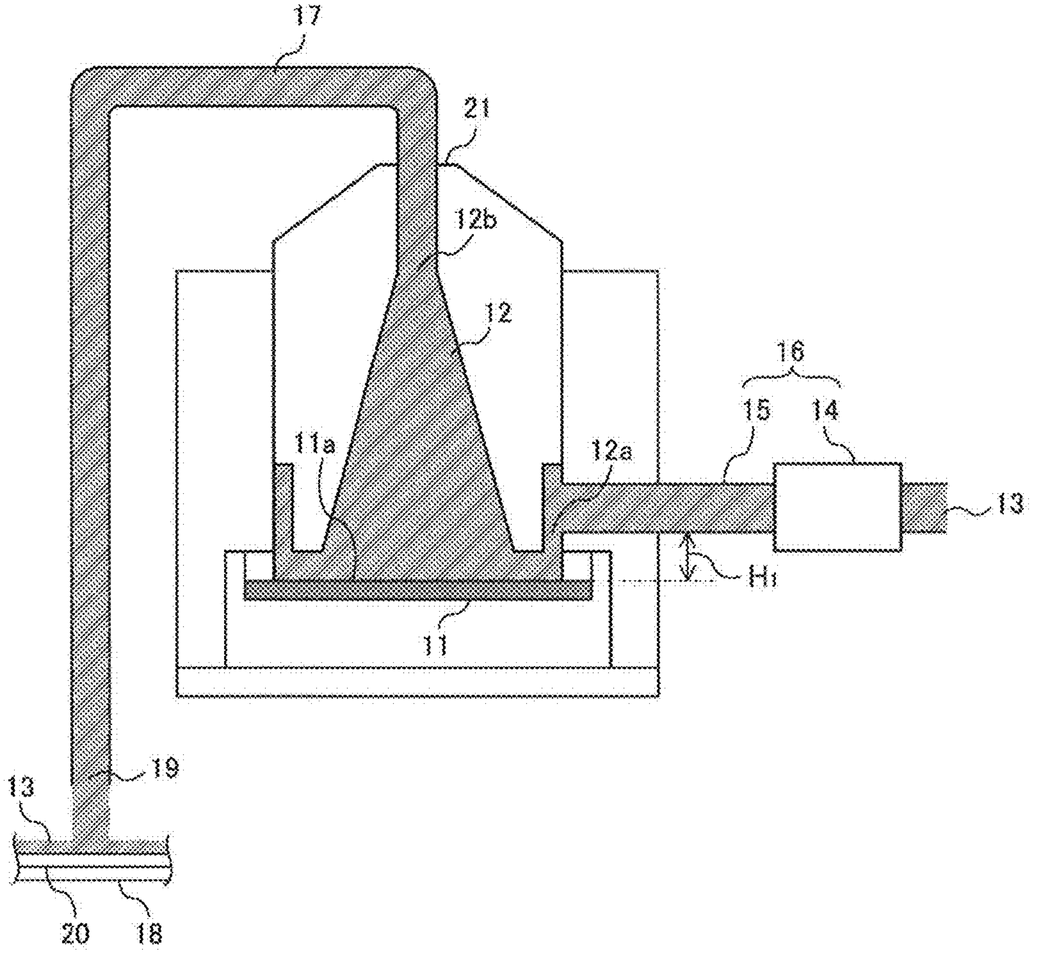
FIG. 1 is a cross-sectional view schematically showing the ultrasonic cleaning apparatus according to an aspect of the present invention.

FIG. 1 is a cross-sectional view schematically showing the ultrasonic cleaning apparatus according to an aspect of the present invention.

The ultrasonic cleaning apparatus has a liquid storage part 12 provided in contact with an ultrasonic vibrator 11, and the ultrasonic vibrator 11 has a contact surface 11*a* coming into contact with a cleaning liquid 13 in the liquid storage part 12. The liquid storage part 12 is disposed on the contact surface 11*a*. Namely, the contact surface 11*a* faces to the direction opposite to the direction in which the force of gravity is applied (the direction in which the cleaning liquid 13 falls). Furthermore, the diameter of the liquid storage part 12 is formed so as to be larger on the side close to the contact surface 11*a* and to be smaller with the increase in the distance from the contact surface 11*a*. The inside surface of the liquid storage part 12 has a smooth and inclined surface.

The liquid storage part 12 has an inflow port 12*a* that makes the cleaning liquid 13 flow in the liquid storage part 12, and an outflow port 12*b* that makes the cleaning liquid 13 flow out the liquid storage part 12. The contact surface 11*a* of the ultrasonic vibrator 11 is disposed lower than the inflow port 12*a* by height $H_1$. Furthermore, the contact surface 11*a* of the ultrasonic vibrator 11 is disposed lower than the outflow port 12*b*, and the outflow port 12*b* is disposed above the contact surface 11*a*.

Moreover, the ultrasonic cleaning apparatus has a cleaning liquid supply mechanism 16 that supplies the cleaning liquid 13 to the liquid storage part 12. The cleaning liquid supply mechanism 16 has a supply pipe 15, a flow control mechanism 14 and a cleaning liquid supply source (not illustrated). The supply pipe 15 is connected to the inflow port 12*a* of the liquid storage part 12. The flow control mechanism 14 can control the flow rate of the cleaning liquid 13 supplied to the liquid storage part 12, and can also stop the supply of the cleaning liquid 13.

In addition, the ultrasonic cleaning apparatus has a nozzle 21 connected to the outflow port 12*b* of the liquid storage part 12, and the nozzle 21 is connected to an ultrasonic propagating tube 17. The cleaning liquid 13 to which ultrasonic vibrations have been applied by using the ultrasonic vibrator 11 in the liquid storage part 12 is flown to the ultrasonic propagating tube 17 through the outflow port 12*b*. Since the outflow port 12*b* is positioned above the contact surface 11*a*, the ultrasonic propagating tube 17 has a shape of being bent downward. Consequently, a discharge port 19 of the ultrasonic propagating tube 17 can face downward (the direction in which the force of gravity is applied).

Furthermore, the ultrasonic cleaning apparatus has a holding mechanism that holds an object to be cleaned 20, such as a substrate and the holding mechanism has a stage 18 that holds the object to be cleaned 20. The object to be cleaned 20 held with the stage 18 can be cleaned using the cleaning liquid 13 discharged from the discharge port 19 of the ultrasonic propagating tube 17. Specifically, ultrasonic waves that are propagated in the cleaning liquid 13 made flow in the ultrasonic propagating tube 17 repeat reflections in the ultrasonic propagating tube 17, are propagated, and reach the object to be cleaned 20. Consequently, the surface of the object to be cleaned 20 is cleaned using the ultrasonic waves and the cleaning liquid 13.

Note that metals such as SUS, or glass-based materials such as quartz or sapphire may be used as the material quality of the ultrasonic propagating tube 17.

Next, a method for cleaning an object to be cleaned such as a substrate by using the ultrasonic cleaning apparatus shown in FIG. 1 will be explained.

First, the cleaning liquid 13 such as water or a chemical liquid is supplied to the supply pipe 15 by the cleaning liquid supply source, the cleaning liquid whose flow rate has been controlled by the flow control mechanism 14 is supplied to the liquid storage part 12 through the supply pipe 15 and the inflow port 12*a*, and is stored temporarily in the liquid storage part 12. Ultrasonic vibrations are applied to the cleaning liquid 13 stored in the liquid storage part 12 by using the ultrasonic vibrator 11, the cleaning liquid 13 to which ultrasonic vibrations have been applied is flown to the ultrasonic propagating tube 17 through the outflow port 12*b* and is discharged from the discharge port 19 of the ultrasonic propagating tube 17 onto the object to be cleaned 20. The discharged cleaning liquid 13 maintains a state where ultrasonic vibrations have been applied and is supplied to the object to be cleaned 20, to thereby perform ultrasonic cleaning.

According to the embodiment, the liquid storage part 12 is disposed on the contact surface 11*a* of the ultrasonic vibrator 11, and contact surface 11*a* is disposed lower than each of the inflow port 12*a* and the outflow port 12*b* of the liquid storage part 12. Consequently, even when the inflow rate of the cleaning liquid 13 from the inflow port 12*a* is made small after putting the contact surface 11*a* into a state of being covered with the cleaning liquid 13 by flowing in the cleaning liquid 13 into the liquid storage part 12 from the inflow port 12*a*, there can be maintained the state where the contact surface 11*a* is covered with the cleaning liquid 13 by the force of gravity. Accordingly, the supply amount of the cleaning liquid 13 into the liquid storage part 12 can be made small, and the supply amount can be set to be the discharge amount from the discharge port 19 of the ultrasonic propagating tube 17. As the result, the use amount of the cleaning liquid can be remarkably reduced as compared with that of the conventional ultrasonic cleaning apparatus shown in FIG. 4, and, for example, can be reduced to approximately 1/10 of the minimum supply amount of the ultrasonic cleaning apparatus shown in FIG. 4.

Furthermore, in the embodiment, even when the inflow of the cleaning liquid 13 from the inflow port 12*a* is stopped after putting the contact surface 11*a* into a state of being covered with the cleaning liquid 13 by flowing in the cleaning liquid 13 into the liquid storage part 12 from the inflow port 12*a*, there can be maintained the state where the contact surface 11*a* is covered with the cleaning liquid 13 by the force of gravity. Accordingly, an intermittent sequence as shown in FIG. 2 can be performed, and as the result, the use amount of the cleaning liquid can be remarkably reduced as compared with that of the conventional ultrasonic cleaning apparatus shown in FIG. 4.

Figure 2:
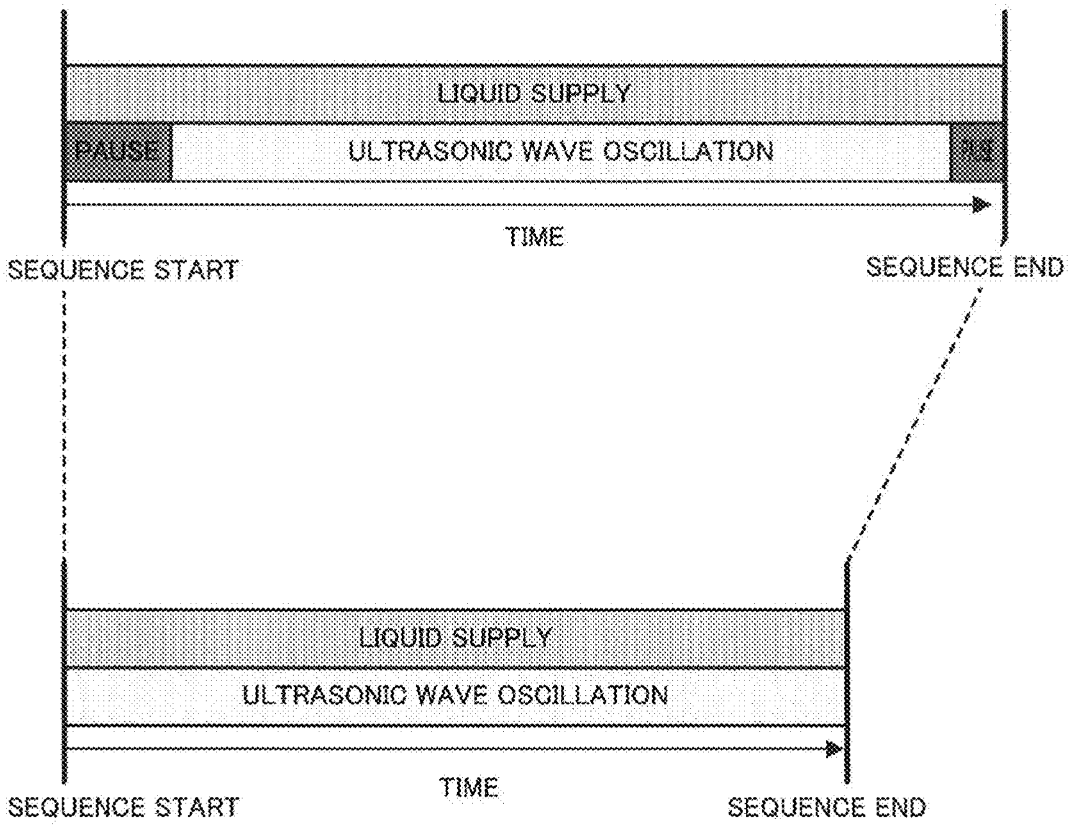
FIG. 2 is a drawing showing a sequence while making a comparison between the ultrasonic cleaning apparatus shown in FIG. 4 and the ultrasonic cleaning apparatus shown in FIG. 1 when subjecting a substrate being an object to be cleaned to ultrasonic cleaning one by one.
Figure 4:
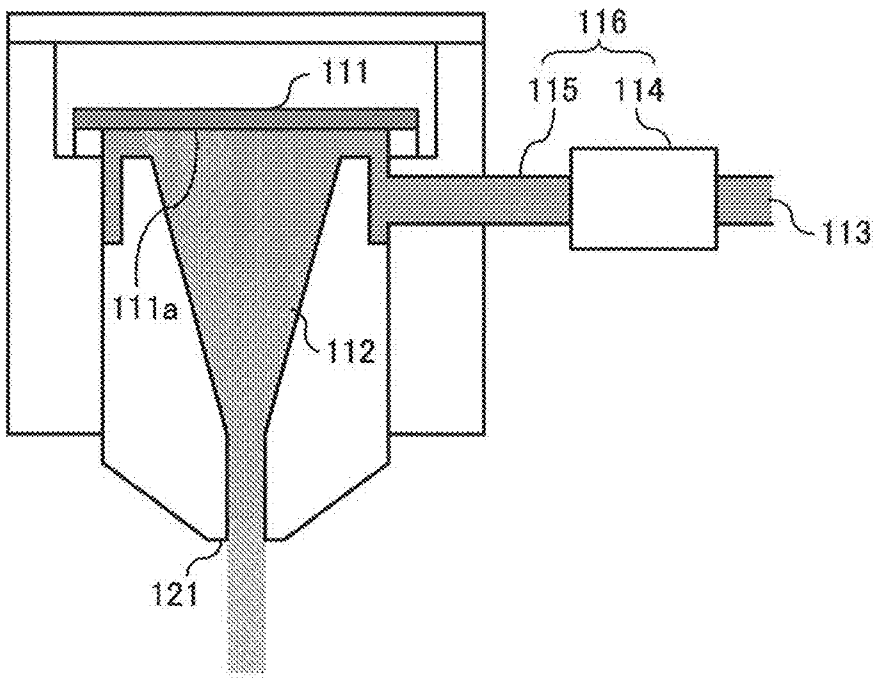
FIG. 4 is a cross-sectional view schematically showing a conventional ultrasonic cleaning apparatus.

FIG. 2 is a drawing showing a sequence obtained by comparing the ultrasonic cleaning apparatus shown in FIG. 4 with the ultrasonic cleaning apparatus shown in FIG. 1 when subjecting substrates being objects to be cleaned to ultrasonic cleaning one by one. The sequence shown on the upper side in FIG. 2 corresponds to the case where the ultrasonic cleaning apparatus shown in FIG. 4 is used, and the sequence shown on the lower side in FIG. 2 corresponds to the case where the ultrasonic cleaning apparatus shown in FIG. 1 is used.

In the ultrasonic cleaning apparatus shown in FIG. 4, when the supply of the cleaning liquid 113 into the liquid storage part 112 is stopped in exchanging a substrate to be cleaned after the completion of ultrasonic cleaning of a substrate, the cleaning liquid 113 in the liquid storage part 112 is discharged from the nozzle 121 due to the force of gravity, and a part that does not come into contact with the cleaning liquid 113 (a cavity) is generated on the contact surface 111*a* of the ultrasonic vibrator 111. Therefore, even when starting the supply of the cleaning liquid 113 into the liquid storage part 112 after exchanging a substrate to be cleaned, it is necessary to start the ultrasonic wave oscillation with the ultrasonic vibrator 111 after waiting for a sufficient time until the inside of the liquid storage part 112 is filled with the cleaning liquid 113 (that is, until the contact surface 111*a* is completely covered with the cleaning liquid 113). This is because, otherwise, liquid shortage or bubble entrainment of the liquid storage part 112 may be generated. Then, when the ultrasonic cleaning of the substrate is completed, it is necessary to stop the supply of the cleaning liquid 113 into the liquid storage part 112 after waiting for the complete stop of the ultrasonic wave oscillation with the ultrasonic vibrator 111. This is because, if the supply of the cleaning liquid 113 into the liquid storage part 112 is stopped before the complete stop of the ultrasonic wave oscillation with the ultrasonic vibrator 111, liquid shortage or bubble entrainment in the liquid storage part 112 may be generated.

In contrast, in the ultrasonic cleaning apparatus shown in FIG. 1, after the completion of the ultrasonic cleaning of a substrate, even when the supply of the cleaning liquid 13 into the liquid storage part 12 is stopped in exchanging the substrate for a substrate to be cleaned, a state where the contact surface 11*a* of the ultrasonic vibrator 11 is covered with the cleaning liquid 13 can be maintained by the force of gravity. Consequently, the liquid shortage or the bubble entrainment in the liquid storage part 12 is not generated. Therefore, after exchanging a substrate to be cleaned, the ultrasonic wave oscillation with the ultrasonic vibrator 11 can be started simultaneously with the start of supplying the cleaning liquid 13 into the liquid storage part 12 or before starting the supply of the cleaning liquid 13. In addition, when the ultrasonic cleaning of the substrate is completed, the ultrasonic wave oscillation with the ultrasonic vibrator 11 can be stopped simultaneously with the stop of supplying the cleaning liquid 13 into the liquid storage part 12 or after the stop of supplying the cleaning liquid 13.

Accordingly, in the ultrasonic cleaning apparatus shown in FIG. 1, the pause time of the ultrasonic wave oscillation shown in FIG. 2 becomes unnecessary, and thus the use amount of the cleaning liquid can be remarkably reduced and the process time can be shortened as compared with the conventional ultrasonic cleaning apparatus shown in FIG. 4.

In view of the above explanation, the flow control mechanism 14 of the ultrasonic cleaning apparatus shown in FIG. 1 preferably has a function of stopping the inflow of the cleaning liquid 13 from the inflow port 12*a* after forming the state of covering the contact surface 11*a* with the cleaning liquid 13 by making the cleaning liquid 13 flow in the liquid storage part 12 from the inflow port 12*a* and a function of starting the ultrasonic wave oscillation with the ultrasonic vibrator 11 simultaneously with starting the inflow of the cleaning liquid 13 into the liquid storage part 12 from the inflow port 12*a* or before starting the inflow of the cleaning liquid 13, and preferably has a function of stopping the ultrasonic wave oscillation with the ultrasonic vibrator 11, after making the cleaning liquid 13 in the liquid storage part 12 to which ultrasonic vibrations had been applied by starting the ultrasonic wave oscillation with the ultrasonic vibrator 11, simultaneously with stopping the inflow of the cleaning liquid 13 into the liquid storage part 12 from the inflow port 12*a* or after stopping the inflow of the cleaning liquid 13, flow out the liquid storage part 12 from the outflow port 12*b*.

Second Embodiment

Figure 3:
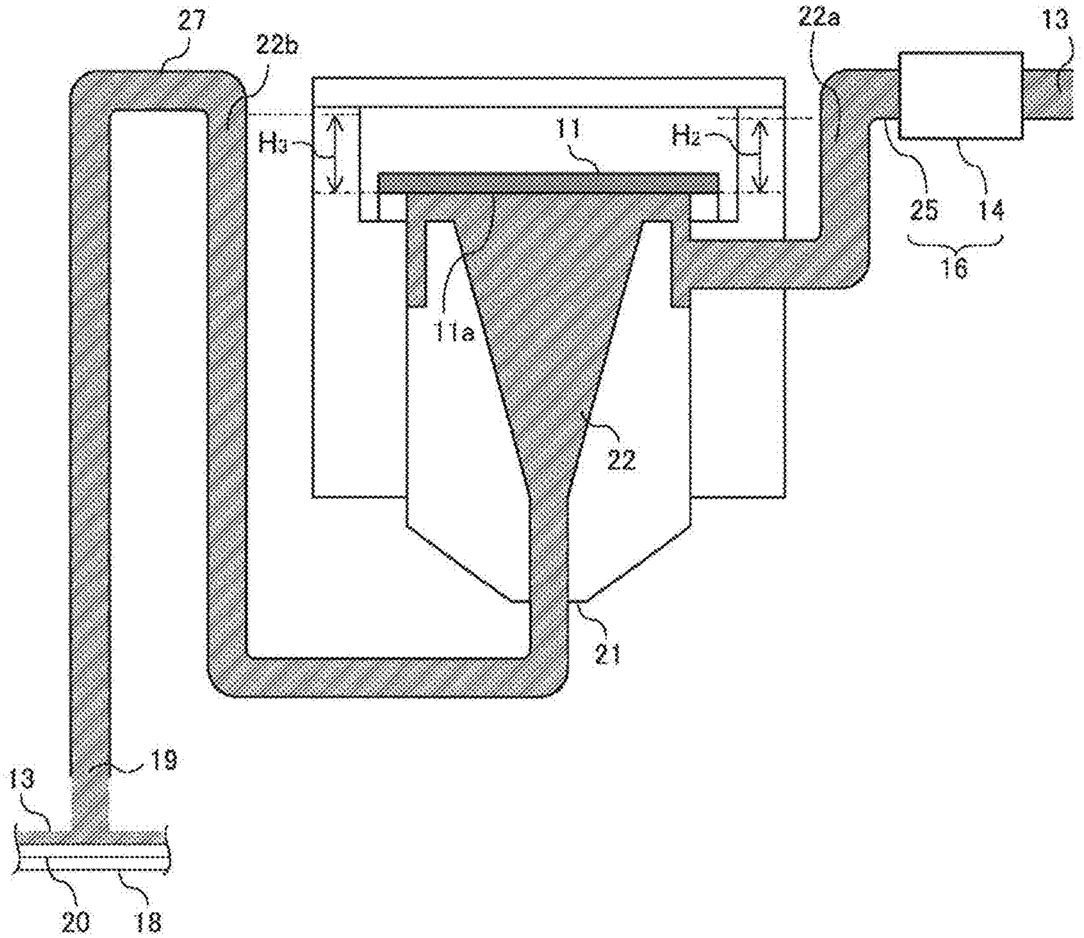
FIG. 3 is a cross-sectional view schematically showing the ultrasonic cleaning apparatus according to an aspect of the present invention.

FIG. 3 is a cross-sectional view schematically showing the ultrasonic cleaning apparatus according to an aspect of the present invention, in which the same sign is attached to the part same as that in FIG. 1 and the explanation of the same part is omitted.

The ultrasonic cleaning apparatus has a liquid storage part 22 that is provided in contact with the ultrasonic vibrator 11, and the ultrasonic vibrator 11 has the contact surface 11*a* that comes into contact with the cleaning liquid 13 in the liquid storage part 22. The liquid storage part 22 is disposed below the contact surface 11*a*. Namely, the contact surface 11*a* faces to the direction in which the force of gravity is applied (the direction in which the cleaning liquid 13 falls).

The liquid storage part 22 has an inflow port 22*a* that makes the cleaning liquid 13 flow in the liquid storage part 22, and an outflow port 22*b* that makes the cleaning liquid 13 flow out the liquid storage part 22. The liquid storage part 22 in the embodiment is different from that in the first embodiment in that a part of a supply pipe 25, the nozzle 21 and a part of a ultrasonic propagating tube 27 are included.

The contact surface 11*a* of the ultrasonic vibrator 11 is disposed lower than the inflow port 22*a* by a height of $H_2$. In addition, the contact surface 11*a* of the ultrasonic vibrator 11 is disposed lower than the outflow port 22*b* by a height of $H_3$.

Furthermore, the ultrasonic cleaning apparatus has a cleaning liquid supply mechanism 16 that supplies the cleaning liquid 13 to the liquid storage part 22. The cleaning liquid supply mechanism 16 has the supply pipe 25, the flow control mechanism 14 and the cleaning liquid supply source (not illustrated).

Moreover, the cleaning liquid 13 to which ultrasonic vibrations have been applied using the ultrasonic vibrator 11 in the liquid storage part 22 is flown to the ultrasonic propagating tube 27 through the outflow port 22*b*.

In addition, the object to be cleaned 20 held by the stage 18 can be cleaned by the cleaning liquid 13 discharged from the discharge port 19 of the ultrasonic propagating tube 27. Specifically, the ultrasonic waves propagating in the cleaning liquid 13 that is flown into the ultrasonic propagating tube 27 repeat reflections in the ultrasonic propagating tube 27, are propagated and reach the object to be cleaned 20. Consequently, the surface of the object to be cleaned 20 is cleaned by the ultrasonic waves and the cleaning liquid 13.

Next, a method for cleaning an object to be cleaned such as a substrate using the ultrasonic cleaning apparatus shown in FIG. 3 will be explained.

First, the cleaning liquid 13 such as water or a chemical liquid is supplied to the supply pipe 25 by the cleaning liquid supply source, the cleaning liquid whose flow rate has been controlled by the flow control mechanism 14 is supplied to the liquid storage part 22 through the supply pipe 25 and the inflow port 22*a*, and is stored temporarily in the liquid storage part 22. Ultrasonic vibrations are applied to the cleaning liquid 13 stored in the liquid storage part 22 by using the ultrasonic vibrator 11, the cleaning liquid 13 to which ultrasonic vibrations have been applied is flown to the ultrasonic propagating tube 27 through the outflow port 22*b* and is discharged from the discharge port 19 of the ultrasonic propagating tube 27 onto the object to be cleaned 20. The discharged cleaning liquid 13 maintains a state where ultrasonic vibrations have been applied and is supplied to the object to be cleaned 20, to thereby perform ultrasonic cleaning.

Note that, during accumulation of the cleaning liquid 13 up to the ultrasonic propagating tube 27 after supplying the cleaning liquid 13 to the supply pipe 2, it is preferable to provide an air vent valve (not illustrated) on the ultrasonic propagating tube 27 and to vent the air, in order to vent air accumulated during this period.

According to the embodiment, the liquid storage part 22 is disposed below the contact surface 11*a* of the ultrasonic vibrator 11, and contact surface 11*a* is disposed lower than each of the inflow port 22*a* and the outflow port 22*b* of the liquid storage part 22. Consequently, even when the inflow rate of the cleaning liquid 13 from the inflow port 22*a* is made small after putting the contact surface 11*a* into a state of being covered with the cleaning liquid 13 by flowing in the cleaning liquid 13 into the liquid storage part 22 from the inflow port 22*a*, there can be maintained the state where the liquid storage part 22 is filled with the cleaning liquid 13 (that is, the state where the contact surface 11*a* is covered with the cleaning liquid 13). Accordingly, the supply amount of the cleaning liquid 13 into the liquid storage part 22 can be made small, and the supply amount can be set to be the discharge amount from the discharge port 19 of the ultrasonic propagating tube 27. As the result, as is the case for the first embodiment, the use amount of the cleaning liquid can be remarkably reduced as compared with that of the conventional ultrasonic cleaning apparatus shown in FIG. 4.

Furthermore, in the present embodiment, even when the inflow of the cleaning liquid 13 from the inflow port 22*a* is stopped after putting the inside of the liquid storage part 22 into a state of being filled with the cleaning liquid 13 (namely, the state of covering the contact surface 11*a* with the cleaning liquid 13) by making the cleaning liquid 13 flow in the liquid storage part 22 from the inflow port 22*a*, the state where the liquid storage part 22 is filled with the cleaning liquid 13 (namely, the state where the contact surface 11*a* is covered with the cleaning liquid 13) can be maintained. Accordingly, as is the case for the first embodiment, an intermittent sequence as shown in FIG. 2 can be performed, and as the result, the use amount of the cleaning liquid can be remarkably reduced as compared with that of the ultrasonic cleaning apparatus shown in FIG. 4.

EXPLANATION OF SYMBOLS

11 . . . ultrasonic vibrator
11*a* . . . contact surface
12 . . . liquid storage part
12*a* . . . inflow port
12*b* . . . outflow port
13 . . . cleaning liquid
14 . . . flow control mechanism
15 . . . supply pipe
16 . . . cleaning liquid supply mechanism
17 . . . ultrasonic propagating tube
18 . . . stage
19 . . . discharge port
20 . . . object to be cleaned
21 . . . nozzle
22 . . . liquid storage part
22*a* . . . inflow port
22*b* . . . outflow port
25 . . . supply pipe
27 . . . ultrasonic propagating tube
111 . . . ultrasonic vibrator
111*a* . . . contact surface
112 . . . liquid storage part
113 . . . cleaning liquid
114 . . . flow control mechanism
115 . . . supply pipe
116 . . . cleaning liquid supply mechanism

The invention claimed is:

1. An ultrasonic cleaning apparatus, comprising:
an ultrasonic vibrator;
a liquid storage part provided in contact with said ultrasonic vibrator;
an inflow port that makes a cleaning liquid flow in said liquid storage part;
an outflow port that makes said cleaning liquid flow out said liquid storage part;
a cleaning liquid supply mechanism that supplies said cleaning liquid to said liquid storage part through said inflow port; and
an ultrasonic propagating tube that flows, through said outflow port, said cleaning liquid to which ultrasonic vibrations have been applied with said ultrasonic vibrator in said liquid storage part,
wherein a contact surface on which said ultrasonic vibrator comes into contact with said cleaning liquid is disposed lower than each of said inflow port and said outflow port,
wherein:
said liquid storage part is disposed above said contact surface;
said ultrasonic propagating tube is shaped so as to be bent downward such that a discharge port of said propagating tube is disposed below said contact surface;
an object to be cleaned is cleaned with said cleaning liquid discharged from said ultrasonic propagating tube.

2. The ultrasonic cleaning apparatus according to claim 1, wherein said cleaning liquid supply mechanism has a flow control mechanism that controls a flow rate of said cleaning liquid to be supplied to said liquid storage part.

3. The ultrasonic cleaning apparatus according to claim 2, wherein said ultrasonic vibrator has a function of starting ultrasonic wave oscillation after said flow control mechanism makes a cleaning liquid flow in said liquid storage part from said inflow port to thereby put said contact surface into a state of being covered with said cleaning liquid and stops an inflow of said cleaning liquid from said inflow port, and simultaneously with restarting an inflow of said cleaning liquid into said liquid storage part from said inflow port or before restarting an inflow of said cleaning liquid.

4. The ultrasonic cleaning apparatus according to claim 3, wherein said ultrasonic vibrator has a function of stopping ultrasonic wave oscillation, after said flow control mechanism makes a cleaning liquid in said liquid storage part to which ultrasonic vibrations had been applied by the start of ultrasonic wave oscillation with the ultrasonic vibrator, flow out said liquid storage part from said outflow port, simultaneously with stopping an inflow of a cleaning liquid into said liquid storage part from said inflow port or after stopping an inflow of said cleaning liquid.

5. The ultrasonic cleaning apparatus according to claim 1, wherein said liquid storage part has a function of maintaining a state where said contact surface is covered with a cleaning liquid, even when an inflow of said cleaning liquid from said inflow port is stopped or inflow rate of said cleaning liquid is made small, after putting said contact surface into a state of being covered with said cleaning liquid by making said cleaning liquid flow in said liquid storage part from said inflow port.

6. An ultrasonic cleaning method comprising the steps of:
preparing an ultrasonic cleaning apparatus which has a liquid storage part provided in contact with an ultrasonic vibrator, and in which a contact surface on which said ultrasonic vibrator comes into contact with a cleaning liquid in said liquid storage part is disposed lower than each of an inflow port and an outflow port of said liquid storage part; and
maintaining a state where said contact surface is covered with the cleaning liquid, even when an inflow of said cleaning liquid from said inflow port is stopped or inflow rate of said cleaning liquid is made small, after putting said contact surface into a state of being covered with said cleaning liquid by making said cleaning liquid flow in said liquid storage part from said inflow port,
wherein said ultrasonic cleaning apparatus comprising:
a cleaning liquid supply mechanism that supplies said cleaning liquid to said liquid storage part through said inflow port; and
an ultrasonic propagating tube that flows, through said outflow port, said cleaning liquid to which ultrasonic vibrations have been applied with said ultrasonic vibrator in said liquid storage part,
wherein:
said liquid storage part is disposed above said contact surface;

said ultrasonic propagating tube is shaped so as to be bent downward such that a discharge port of said propagating tube is disposed below said contact surface;

an object to be cleaned is cleaned with said cleaning liquid discharged from said ultrasonic propagating tube.

7. An ultrasonic cleaning method comprising the steps of:

preparing an ultrasonic cleaning apparatus which has a liquid storage part provided in contact with an ultrasonic vibrator, and in which a contact surface on which said ultrasonic vibrator comes into contact with a cleaning liquid in said liquid storage part is disposed lower than each of an inflow port and an outflow port of said liquid storage part;

stopping an inflow of said cleaning liquid from said inflow port, after putting said contact surface into a state of being covered with said cleaning liquid by making said cleaning liquid flow in said liquid storage part from said inflow port; and applying ultrasonic vibrations to said cleaning liquid in said liquid storage part, by starting ultrasonic wave oscillation with said ultrasonic vibrator simultaneously with restarting an inflow of a cleaning liquid into said liquid storage part from said inflow port or before restarting an inflow of said cleaning liquid, wherein said ultrasonic cleaning apparatus comprises:

a cleaning liquid supply mechanism that supplies said cleaning liquid to said liquid storage part through said inflow port; and an ultrasonic propagating tube that flows, through said outflow port, said cleaning liquid to which ultrasonic vibrations have been applied with said ultrasonic vibrator in said liquid storage part, wherein:

said liquid storage part is disposed above said contact surface;

said ultrasonic propagating tube is shaped so as to be bent downward such that a discharge port of said propagating tube is disposed below said contact surface;

an object to be cleaned is cleaned with said cleaning liquid discharged from said ultrasonic propagating tube.

8. The ultrasonic cleaning method according to claim 7, comprising the steps of:

making said cleaning liquid to which said ultrasonic vibrations have been applied flow out said liquid storage part from said outflow port, after starting ultrasonic wave oscillation with said ultrasonic vibrator; and stopping ultrasonic wave oscillation with said ultrasonic vibrator, simultaneously with stopping an inflow of a cleaning liquid into said liquid storage part from said inflow port or after stopping an inflow of said cleaning liquid.

* * * * *